(12) United States Patent
Ashdown

(10) Patent No.: US 9,544,142 B2
(45) Date of Patent: *Jan. 10, 2017

(54) DATA AUTHENTICATION USING PLURAL ELECTRONIC KEYS

(71) Applicant: Kingston Digital, Inc., Fountain Valley, CA (US)

(72) Inventor: Scott Newman Ashdown, Ottawa (CA)

(73) Assignee: Kingston Digital, Inc., Fountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,117

(22) Filed: Mar. 23, 2015

(65) Prior Publication Data

US 2015/0215126 A1 Jul. 30, 2015

Related U.S. Application Data

(63) Continuation of application No. 12/638,132, filed on Dec. 15, 2009, now Pat. No. 8,989,383.

(60) Provisional application No. 61/142,481, filed on Jan. 5, 2009.

(51) Int. Cl.
*H04L 9/32* (2006.01)
*H04L 9/08* (2006.01)
*H04L 9/14* (2006.01)

(52) U.S. Cl.
CPC .............. *H04L 9/0891* (2013.01); *H04L 9/14* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| | | |
|---|---|---|
| 5,680,458 A | 10/1997 | Spelman et al. |
| 5,737,419 A | 4/1998 | Ganesan |
| 2002/0044663 A1* | 4/2002 | King .................... G06K 13/085 380/284 |
| 2003/0065934 A1 | 4/2003 | Angelo et al. |
| 2003/0177392 A1 | 9/2003 | Hiltgen |
| 2005/0129236 A1 | 6/2005 | Sharma |
| 2006/0020782 A1 | 1/2006 | Kakii |
| 2006/0242415 A1 | 10/2006 | Gaylor |
| 2007/0160063 A1* | 7/2007 | Mynam ................. H04L 63/068 370/395.52 |
| 2008/0025514 A1 | 1/2008 | Coombs |
| 2008/0123862 A1 | 5/2008 | Rowley |
| 2008/0165958 A1 | 7/2008 | Matsushita |

\* cited by examiner

*Primary Examiner* — David Le
(74) *Attorney, Agent, or Firm* — Dorsey & Whitney LLP

(57) ABSTRACT

A method for transmitting digital data to a recipient via a communications network includes providing digital data and digitally signing the digital data using N cryptographic keys. Each of the N cryptographic keys is associated with a same sender of the digital data, and N>1. The recipient receives the digital data and verifies the digital signature using N cryptographic keys associated with the N cryptographic keys used to sign the digital data. In dependence upon verifying the digital signature, the recipient accepts the digital data as being authentic.

20 Claims, 3 Drawing Sheets

DATA AUTHENTICATION USING PLURAL ELECTRONIC KEYS

This application is a continuation of U.S. patent application Ser. No. 12/638,132, filed Dec. 15, 2009, now U.S. Pat. No. 8,989,383, entitled "Data Authentication Using Plural Electronic Keys," which claims priority to U.S. Provisional Application No. 61/142,481, filed Jan. 5, 2009, entitled "Data Authentication Using Plural Electronic Keys."

FIELD OF THE INVENTION

The invention relates generally to data security and more particularly to a method and system for data authentication using plural electronic keys.

BACKGROUND OF THE INVENTION

It is increasingly common to exchange digital data, such as for instance digital documents and forms, via a communications network. More specifically, digital data is exchanged for purposes relating to commerce, (i.e. on-line shopping and on-line banking, etc.), upgrading or updating firmware or software of computers or other electronic devices, and communicating (i.e. e-mail). Typically, the communications network is not secure and so it is necessary to use some form of encryption or a digital signature, or a combination of these, in order to reduce the risk of private and/or confidential information being intercepted by a party other than the intended recipient. Most often, the communications network is the Internet.

Encryption and digital signing processes both involve encoding digital data in some way using a secure electronic key, otherwise known as a cryptographic key or a cryptokey. Prior to transmitting the digital data via the communications network, a sender uses a secure electronic key to digitally sign and/or encrypt the digital data. The encoded digital data is then transmitted via the communications network, and is received by a recipient. The recipient subsequently uses a cryptographic key to verify the digital signature of the sender and/or decrypt the encrypted digital data. Different types of cryptography schemes are known, including symmetric and asymmetric schemes. In a symmetric cryptography scheme the sender and the recipient are both in possession of identical secure electronic keys, whereas asymmetric cryptography schemes make use of private/public key pairs.

A digital signature or digital signature scheme is typically a type of asymmetric cryptography, which is used to simulate the security properties of a handwritten signature on paper. Digital signatures mainly provide authentication of a "message". In practice, however, this type of signature is not used directly, but rather the message to be signed is first hashed to produce a short digest that is then signed. Accordingly, when it is desired to digitally sign a message for transmission via a communications network a one-way mathematical process is performed on the digital data that comprises the message, in order to generate the digest. The generated digest can be verified to be from the digital data that comprises the message, and typically it is a small amount of data relative to the original data to which it relates. The sender then digitally signs the digest using a secure electronic key, and the digitally signed digest is transmitted along with the message to a recipient. Upon receiving the digitally signed message, the recipient uses a signature verifying process, which given a message, a public key and a signature, either accepts the signature as being authentic or rejects the signature. In general, a digital signature scheme must satisfy two main criteria. First, a digital signature that is generated from a fixed message and fixed private key must verify on that message and the corresponding public key. Secondly, it must be computationally infeasible for a party who does not possess the private key to generate a valid signature reliably within a short time frame.

When using symmetric cryptokeys—a same key for encrypting and decrypting of data, digital signatures function similarly though the verification of the signature is only performable by systems having or having access to the symmetric cryptokey. For example, when a same organization wants to verify communications between different offices, each office is provided with a copy of a same cryptokey and symmetric encryption processes are then usable therebetween for ciphering or for digitally signing of data.

A problem arises when the private key is compromised. For instance, the private key is compromised when an unauthorized party obtains access to or knowledge of the private key. In this scenario, the unauthorized party may decrypt a message that is intended for the recipient and/or may use the compromised private key to digitally sign electronic documents. Accordingly, when the private key is compromised it becomes necessary to generate a new private/public key pair and to remove the compromised key from use such that documents digitally signed with the compromised key are no longer accepted. A simple way to do this is to expire the compromised key and then to require physical attendance at a secured location to receive a new key. In another example, this is done using a master key, which is used only to communicate new keys and is not used for encoding other data for transmission via the communications network. Unfortunately, in the unlikely event that the master key is compromised then all security devices that are associated with that master key become worthless. In particular, the compromised master key can continue to be used by an unauthorized entity to generate valid keys that are not authorized for exchanging data between such devices. For this reason, master keys are protected typically using tamper resistant modules and/or secure physical storage. The high level of security that is necessary to prevent the master key from being compromised also limits the ability of an authorized user to utilize the master key at different geographic locations, since security must be provided to transfer the key from place to place and the destination system must be secure and adapted to interface with the master key module.

A number of variations of the basic digital signature scheme are known. For instance, two or more different sending entities may each digitally sign the same digital data in the fashion that is outlined above. However, in this case each entity merely uses their own private key to sign a digest of the same digital data. This is analogous to each sending entity applying their own handwritten signature to a paper document, as evidence that each sending entity assents to the contents of the message that is being transmitted. If the secure electronic key of one of the sending entities is compromised, then it may continue to be used by an unauthorized party in order to fraudulently sign messages as originating from that sending entity. If both sending entities are required to sign every message prior to the message being transmitted then the effects of one of the keys being compromised may be quite limited. However, in the event that one of the sending entities obtains the secure electronic key of the other sending entity, then that sending entity becomes able to apply both of the required digital signatures to any message they wish. Furthermore, an unauthorized party that is in possession of a compromised key associated with one of the sending entities may digitally sign any message requiring only that sending entity's digital signature or cosign messages that the other entity has already signed. This is particularly problematic when the cryptokey is compromised by the other cosigner. Of course, it is still necessary to use physical security to replace the compromised key.

There is a need for a method and system that overcomes at least some of the disadvantages of the prior art.

SUMMARY OF THE INVENTION

In accordance with an aspect of the invention there is provided a method comprising: providing digital data for being transmitted to a recipient system via a communications network; digitally signing the digital data using N cryptographic keys, each of the N cryptographic keys associated with a same sender of the digital data, and N>1; and, transmitting the digitally signed digital data to the recipient system via the communications network.

In accordance with an aspect of the invention there is provided a method comprising: providing digital data for being transmitted to a recipient system via a communications network; digitally signing the digital data, comprising hashing the digital data and signing the hash using a first cryptographic key and using a second cryptographic key, each of the first cryptographic key and the second cryptographic key being associated with a same sender of the digital data; and, transmitting the digitally signed digital data to the recipient system via the communications network.

In accordance with an aspect of the invention there is provided a method comprising: receiving digital data comprising a first digital signature and a second digital signature, the first digital signature generated using a first cryptographic key associated with a trusted sender and the second digital signature generated using a second cryptographic key associated with the same trusted sender, verifying the first digital signature; verifying the second digital signature; accepting the digital data as authentic, in dependence upon verifying the first digital signature and verifying the second digital signature; and, providing the digital data to a recipient associated with the recipient system in dependence upon accepting the digital data as authentic.

In accordance with an aspect of the invention there is provided a method comprising: transmitting to a recipient via a communications network a message, the message digitally signed using a first cryptographic key and a second cryptographic key; receiving from the recipient an indication that the first cryptographic key is compromised; generating a new first cryptographic key; encrypting the new first cryptographic key using the second cryptographic key; and, transmitting the encrypted new first cryptographic key to the recipient.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
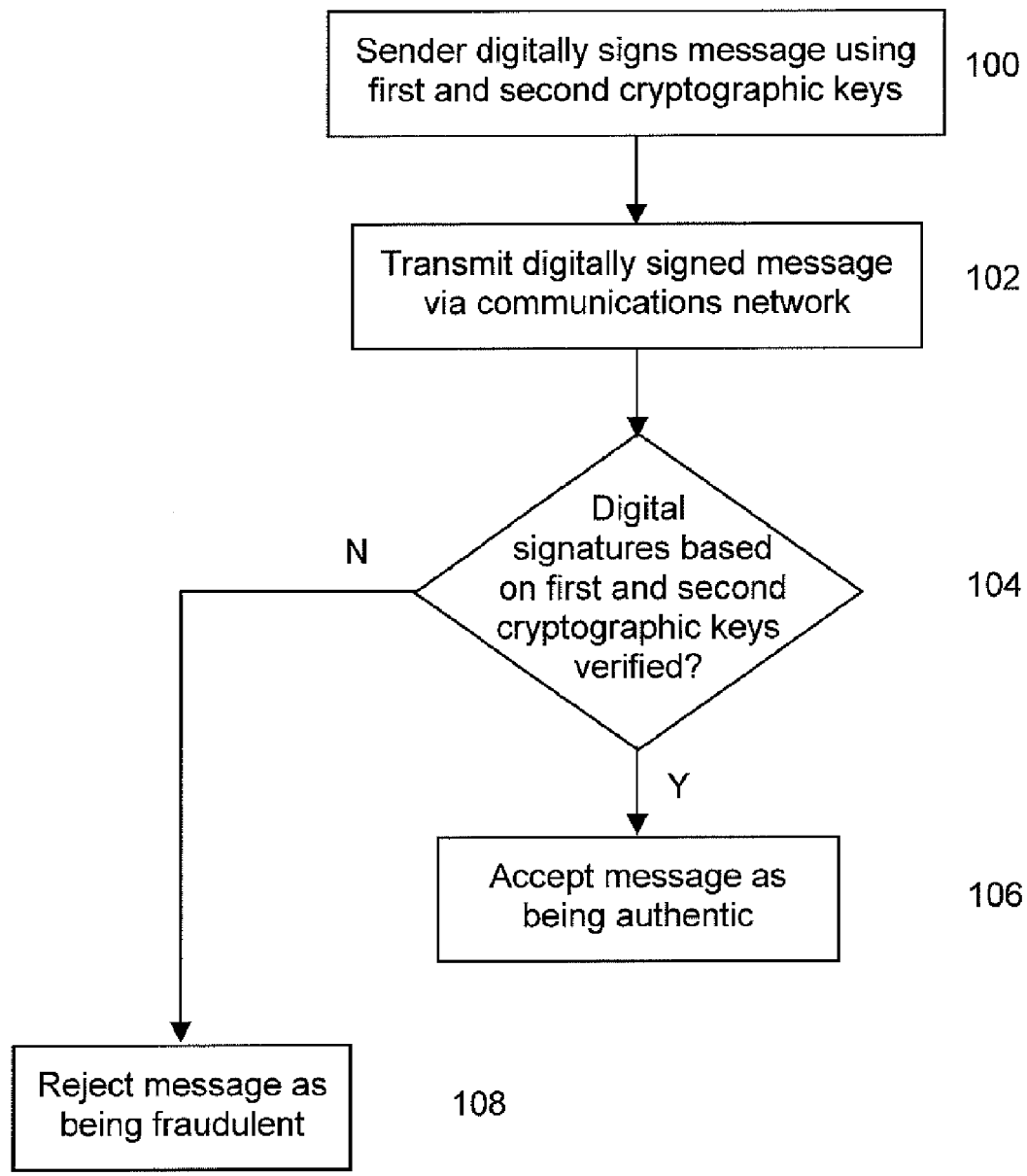
FIG. 1 shows a simplified flow diagram of a method according to an embodiment of the instant invention.

Referring to FIG. 1, shown is a simplified flow diagram of a method according to an embodiment of the instant invention. At 100 a sender digitally signs a message using a first cryptographic key and digitally signs the same message using a second cryptographic key. Both the first cryptographic key and the second cryptographic key are associated with the same sender. Accordingly, the sender digitally signs the same message two times, once using the first cryptographic key and once using the second cryptographic key. At 102 the digitally signed message is transmitted to a recipient via a communications network, such as for instance the Internet. At 104 the recipient verifies the digital signatures based on each one of the first cryptographic key and the second cryptographic key. If both digital signatures are verified, then at 106 the digitally signed message is accepted as being authentic. However, if one of the digital signatures is not verified, then the digitally signed message is rejected at 108.

The method of FIG. 1 optionally uses either a symmetric or an asymmetric cryptographic scheme. When symmetric cryptography is used, both the sender and the recipient are in possession of the same two cryptographic keys. Thus, the sender uses the first and second cryptographic keys to digitally sign the message and the recipient uses the same first and second cryptographic keys to verify the digital signatures. Alternatively, when asymmetric cryptography is used, the sender is in possession of private keys and the recipient is in possession of public keys associated with the private keys. Alternatively, the public keys are publicly available as they are not usable for generating the digital signature. Thus, the sender uses first and second private keys to digitally sign the message and the recipient uses first and second public keys to verify the digital signatures.

Figure 2:
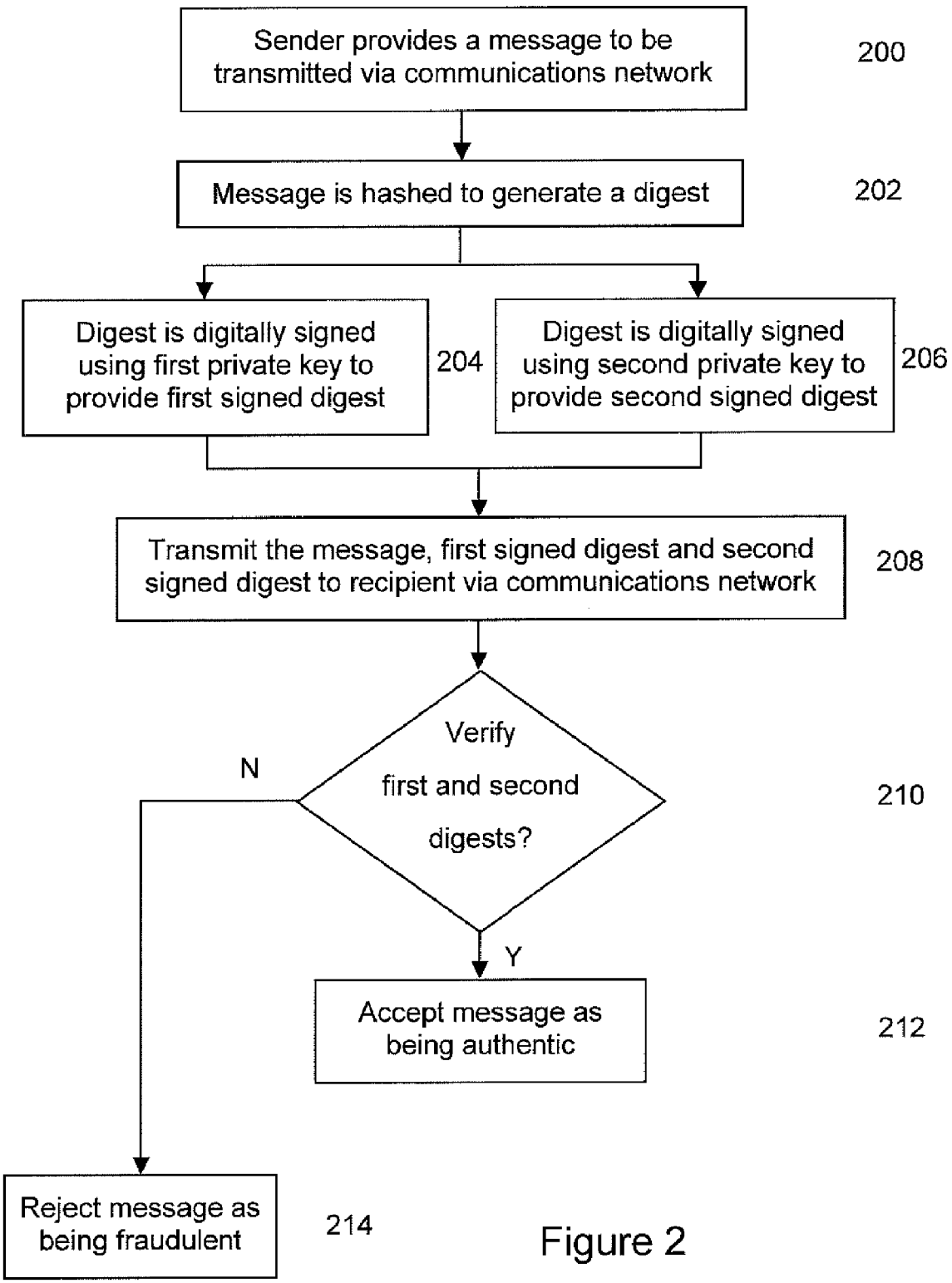
FIG. 2 shows a simplified flow diagram of a method according to an embodiment of the instant invention; and, FIG. 3 shows a simplified flow diagram of a method of replacing compromised keys according to an embodiment of the instant invention.

Referring now to FIG. 2, shown is a simplified flow diagram of a method according to an embodiment of the instant invention. The method of FIG. 2 is discussed in terms of an asymmetric cryptography scheme, but optionally symmetric cryptography is used instead. At 200 a sender provides an electronic document or message, which comprises digital data, for transmission to a recipient via a communications network. At 202 a system that is associated with the sender performs a hashing routine to generate a digest of the electronic document. Optionally, the hashing routine is performed within a security module comprising a secure processor. The digest is signed at 204 using a first private key associated with the sender, so as to generate a first signed digest. The digest is also signed at 206 using a second private key associated with the sender, so as to generate a second signed digest. Optionally, a different digest is generated by repeating step 202 using different hashing routine prior to step 206, and the different digest is then signed at 206 using the second private key associated with the sender. At 208 the first signed digest and the second signed digest are transmitted, with the electronic document or message, to the recipient via the communications network. At 210 the recipient verifies the digital signatures based on each one of the first private key and the second private key. If both digital signatures are verified, then at 212 the digitally signed message is accepted as being authentic. However, if one of the digital signatures is not verified, then the digitally signed message is rejected at 214.

In the event that one of the first and second private keys becomes compromised, then the other of the first and second private keys still provides substantial security. Thus, even in the event that an unauthorized entity compromises one of the first and second private keys, that entity is unable to digitally sign data for being provided to the recipient$_{[S41]}$, since it will be apparent to the recipient that the data is not authentic when it is digitally signed using only one of the two private keys. In fact, upon receiving a message that has been digitally signed using only one of the two private keys, the recipient optionally automatically provides a notification to the actual owner of the first and second keys that one of the two private keys is compromised$_{[S42]}$. A replacement private key is then generated and distributed in a private/public key system, for example, such that the compromised private key is removed from devices and taken out of usage. For example, the uncompromised key is used to secure a replacement key for replacing the compromised key.

Optionally, a number of private keys other than two are employed. In general, the methods that are described with reference to FIGS. 1 and 2 are executed using N keys, where N≥2. Increasing the number of keys results in improved security since every key must be compromised in order to digitally sign fraudulent data. Compromise of all keys at the same time likely would be the result only of an "inside job."

By way of a specific and non-limiting example, a method according to at least one embodiment of the instant invention may be applied to data transfer involving portable security modules. Portable security modules connect to computers and other electronic devices via an interface, such as for instance a Universal Serial Bus (USB) interface. The security modules include a memory element, typically flash memory, and a processor. A set of cryptographic keys is stored in a secure portion of the module. When digital data that is encoded using a plurality of cryptographic keys is provided to the module, the module retrieves a plurality of corresponding keys from a set of keys that is stored in the secure portion of the module, and uses the retrieved plurality of corresponding keys to verify the digital signatures associated with the digital data. For instance, when the digital data comprises a firmware upgrade for the module, then it can be determined that the firmware originates from a trusted source by confirming that the digital data is digitally signed using each of the plurality of cryptographic keys, the plurality of cryptographic keys being verifiable as belonging to the trusted entity. The firmware upgrade is installed if, and only if, it is determined that the digital data comprising the firmware upgrade has been signed using each of the plurality of cryptographic keys. Otherwise, the portable security module does not install the firmware upgrade. Of course, where asymmetric encryption is used, the public keys are optionally retrievable from a public key store instead of being stored within the receiving device.

The above process may be applied more generally to a number of different types of devices that connect to a computer system via an interface, and that require updates/upgrades via a communications network. For instance, a company produces devices that are distributed to various computer systems associated with customers of the company. The company provides a set of symmetric keys within an inaccessible portion of each device and maintains an identical set of the symmetric keys within a cryptographic processor that is operated by the company. When the company wishes to provide an update or upgrade to the devices, the update or upgrade is packaged and digitally signed with N symmetric keys of the set of symmetric keys. The packaged and signed update or upgrade is transmitted via the communications network to the devices. Each device verifies the digital signature(s) using the same N symmetric keys of the set of symmetric keys. If the digital signature(s) based on the N symmetric keys is verified, then the update or upgrade is accepted and installed on the device. If the digital signature(s) based on even one of the N symmetric keys is not verified, then the update or upgrade is rejected and a message is sent to the company to indicate a key compromise.

Figure 3:
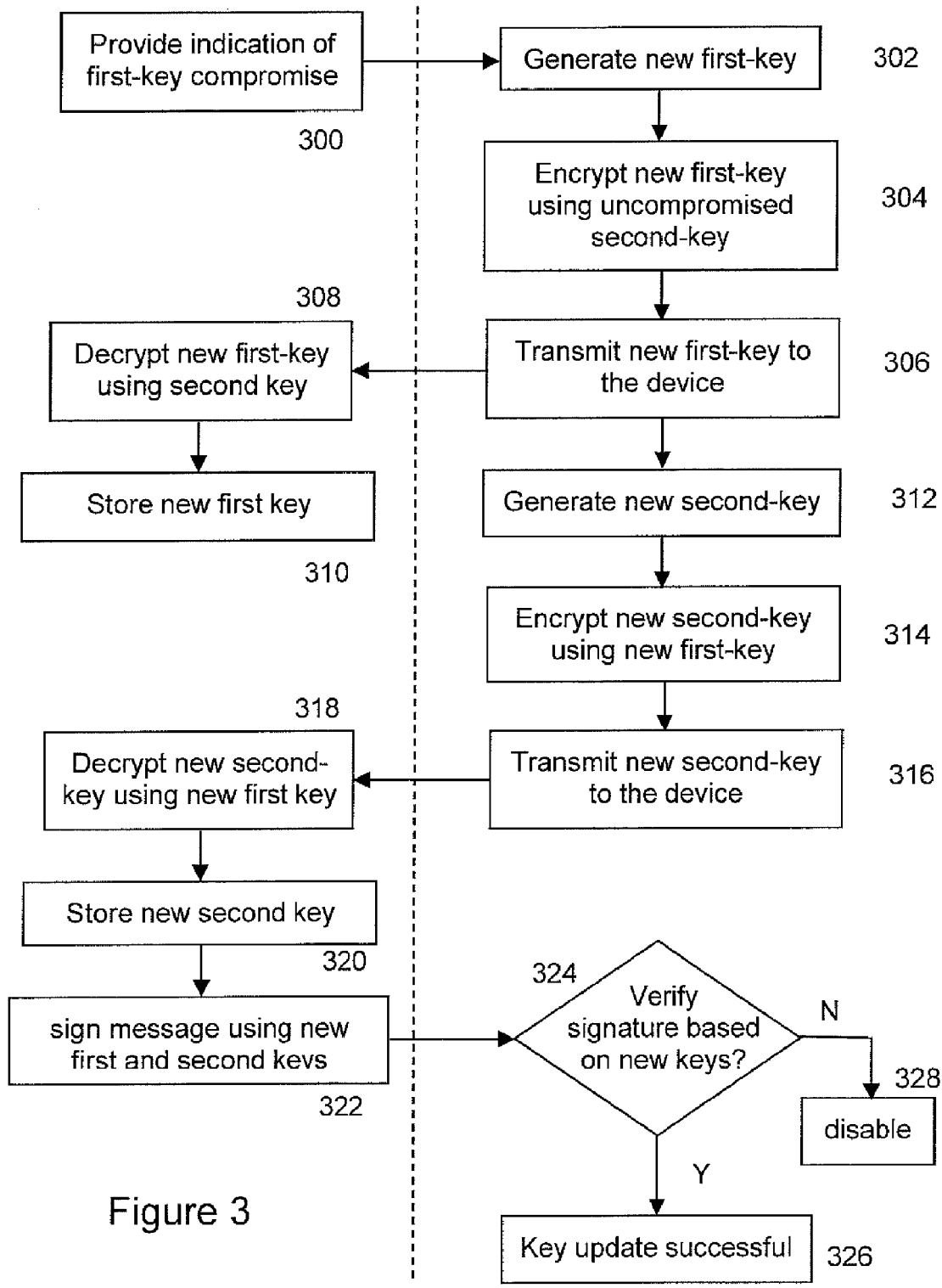

In a specific example in which first and second symmetric keys are used to digitally sign a message, and the first symmetric key becomes compromised, then replacement of the first symmetric key proceeds, for example, as shown in FIG. 3. At 300 the device provides a message to the cryptographic processor indicating that the first symmetric key is compromised. The cryptographic processor generates a new first symmetric key at 302 and encrypts the new first symmetric key using the uncompromised second symmetric key at 304. At 306 the encrypted new first symmetric key is transmitted to the device via the communications network. Upon receipt, at 308 the device decrypts the new first symmetric key using the uncompromised second symmetric key. The new first symmetric key is stored at 310. Next, at 312 the cryptographic processor generates a new second symmetric key, encrypts the new second symmetric key using the previously generated new first symmetric key at 314, and transmits the new second symmetric key to the device via the communications network at 316. Upon receipt, at 318 the device decrypts the new second symmetric key using the new first symmetric key. The new second symmetric key is stored at 320. In this way, the new first symmetric key and the new second symmetric key are stored as part of the set of symmetric keys, replacing the old first symmetric key and the old second symmetric key. The device generates a key replacement confirmation message, digitally signs the message using both the new first symmetric key and the new second symmetric key, and transmits the digitally signed message to the cryptographic processor of the company at 322. At 324 the cryptographic processor of the company verifies the digital signatures based on the new first symmetric key and the new second symmetric key. If the digital signatures are verified, then at 326 the key update is successful. If the digital signatures are not verified, then at 328 the devices are disabled. Alternatively, only the compromised cryptokey is replaced.

Numerous other embodiments may be envisaged without departing from the spirit or scope of the invention.

What is claimed is:

1. A system for data authentication using plural electronic keys, the system comprising:
    memory storing N>1 cryptographic keys, each of the N>1 cryptographic keys being a private cryptographic key associated with a sender of digital data;

a processor configured to digitally sign the data using the N>1 cryptographic keys and to transmit the digitally signed data to a recipient system via a network;
wherein the processor receives from the recipient system an indication that a first of the cryptographic keys is compromised, a second of the cryptographic keys being uncompromised, the processor further configured for:
generating a replacement key for the compromised cryptographic key;
encrypting the replacement key using the uncompromised cryptographic key;
transmitting the encrypted replacement key to the recipient system;
receiving from the recipient system a key replacement confirmation message digitally signed by the replacement key; and,
verifying a digital signature of the key replacement confirmation message based on the replacement key.

2. The system of claim 1, wherein the digitally signed data are verified using N>1 public keys corresponding one each to the N>1 private keys.

3. The system of claim 1, further comprising a first hashing routine performed on the processor to generate a first digest of the digital data, wherein the first digest is digitally signed by the first cryptographic key.

4. The system of claim 3, further comprising a second hashing routine performed on the processor to generate a second digest of the digital data, wherein the second digest is digitally signed by the second cryptographic key.

5. The system of claim 4, wherein the processor is configured to transmit the first digest signed by the first cryptographic key and the second digest signed by the second cryptographic key to the recipient system via the network.

6. The system of claim 1, wherein each of the N>1 cryptographic keys is a symmetric key.

7. The system of claim 1, wherein the processor is further configured to:
generate a second replacement key for the uncompromised cryptographic key, wherein the replacement key for the compromised cryptographic key is a first replacement key;
encrypt the second replacement key using the first replacement key; and,
transmit the second encrypted replacement key to the recipient via the network.

8. A portable security module comprising:
memory storing N>1 cryptographic keys, each of the cryptographic keys being a private cryptographic key associated with a sender of an electronic document; and
a secure processor configured to transmit the electronic document digitally signed by the first and second cryptographic keys;
wherein receiving from the recipient system an indication that the first cryptographic key is compromised, the cryptographic key being uncompromised, the secure processor is configured to:
generate a replacement cryptographic key for the compromised key;
encrypt the replacement cryptographic key using the second cryptographic key, wherein the second cryptographic key is uncompromised; and
transmit the encrypted replacement cryptographic key to the recipient system;
wherein receiving from the recipient system a key replacement confirmation message digitally signed by the replacement cryptographic key, the secure processor is further configured to verify the digital signature of the key replacement confirmation message based on the replacement cryptographic key.

9. The portable security module of claim 8, further comprising an interface configured for coupling the portable security module to a computer system of the sender.

10. The portable security module of claim 9, wherein the memory comprises flash memory storing the N>1 cryptographic keys in a secure portion of the portable security module.

11. The portable security module of claim 8, further comprising a hashing routine performed within the portable security module to hash the electronic document, the hashing routing generating a first digest of the electronic document signed using the first cryptographic key and a second digest of the electronic document signed using the second cryptographic key.

12. The portable security module of claim 11, wherein the secure processor is configured to send the first signed digest and the second signed digest to the recipient system over the network, along with the digitally signed electronic document.

13. A security module comprising:
a processor configured for receiving digital data comprising a first digital signature generated using a first private cryptographic key and a second digital signature generated using a second private cryptographic key, each of the first and second private cryptographic keys associated with a sender of the digital data;
in response to failing to verify the first digital signature, the processor configured for:
sending an indication that the first private cryptographic key is compromised;
verifying the second digital signature, wherein the second private cryptographic key is uncompromised;
receiving first and second replacement keys for the first and second private cryptographic keys, wherein the first and second replacement keys are encrypted using the uncompromised cryptographic key; and
decrypting the first and second replacement keys using the uncompromised cryptographic key;
in dependence upon verifying the first and second digital signatures based on the first and second replacement cryptographic keys, the processor further configured for:
accepting the digital data as authentic; and
providing the digital data to a recipient system.

14. The security module of claim 13, wherein the processor is further configured for transmitting a key replacement confirmation message digitally signed by the first and second replacement keys.

15. The security module of claim 13, wherein the processor is configured for automatically notifying an issuer of the first and second private cryptographic keys of key compromise, in dependence upon failing to verify the first digital signature.

16. The security module of claim 15, wherein the first private cryptographic key is faked or not present.

17. The security module of claim 13, further comprising an interface configured for coupling the processor to the recipient system.

18. The security module of claim 17, further comprising memory storing first and second public keys associated with the first and second private cryptographic keys, wherein failing to verify the first digital signature is performed using the first public key associated with the first private cryptographic key and verifying the second digital signature is performed using the second public key associated with the second private cryptographic key.

19. The security module of claim 17, wherein the first and second private cryptographic keys are symmetric, and further comprising memory for storing same first and second symmetric keys on the security module.

20. The security module of claim 13, wherein the processor is further configured for:
   upgrading firmware of the security module if the first and second digital signatures are verified; and
   sending a message to a company that distributes the device, if one of the first and second digital signatures is not verified.

\* \* \* \* \*

UNITED STATES PATENT AND TRADEMARK OFFICE
CERTIFICATE OF CORRECTION

PATENT NO. : 9,544,142 B2  
APPLICATION NO. : 14/665117  
DATED : January 10, 2017  
INVENTOR(S) : Scott Newman Ashdown It is certified that error appears in the above-identified patent and that said Letters Patent is hereby corrected as shown below:

On the Title Page

At Assignee:
"Kingston Digital, Inc., Fountain View, CA"
Should be:
--Kingston Digital, Inc., Fountain Valley, CA--

In the Specification

At Column 3, Line 39:
"the same trusted sender, verifying"
Should be:
--the same trusted sender; verifying--

Signed and Sealed this
Sixteenth Day of May, 2017

Michelle K. Lee
*Director of the United States Patent and Trademark Office*